United States Patent [19]

Bucker

[11] Patent Number: 4,823,830

[45] Date of Patent: Apr. 25, 1989

[54] RINSE-INJECTION BOX FOR AUTOMATICALLY INTRODUCING CONTROLLED FLOWS OF A RINSE

[75] Inventor: Heinrich Bucker, Langenberg, Fed. Rep. of Germany

[73] Assignee: Westfalia Separator AG, Oelde, Fed. Rep. of Germany

[21] Appl. No.: 144,830

[22] Filed: Jan. 15, 1988

[30] Foreign Application Priority Data

Feb. 2, 1987 [DE] Fed. Rep. of Germany ... 8701540[U]

[51] Int. Cl.$^4$ ............................................. F16K 24/00
[52] U.S. Cl. .................... 137/205; 137/216; 222/67; 222/148
[58] Field of Search ....................... 137/205, 216, 217; 222/67, 148

[56] References Cited

U.S. PATENT DOCUMENTS 2,878,826 3/1959 Dolenga ............................ 137/216
4,485,830 12/1984 Icking et al. .

FOREIGN PATENT DOCUMENTS 3033816 4/1982 Fed. Rep. of Germany .

Primary Examiner—Gerald A. Michalsky
Attorney, Agent, or Firm—Sprung, Horn, Kramer & Woods

[57] ABSTRACT

A rinse-injection box has, between a connection for supplying water from a drinking-water line and an inlet into the rinse-injection box, a valve that opens automatically when water flows in. An opening to the atmosphere prevents water from flowing out of the full box into a drinking-water line that communicates with the connection because the opening prevents the establishment of a vacuum. When the supply of water is discontinued, the valve body will close off the inlet, allowing the vacuum needed for the next rinsing process to become established inside the box. Thus, no non-potable water can be suctioned back into the drinking-water line even when the rinse-injection box is completely full.

6 Claims, 1 Drawing Sheet

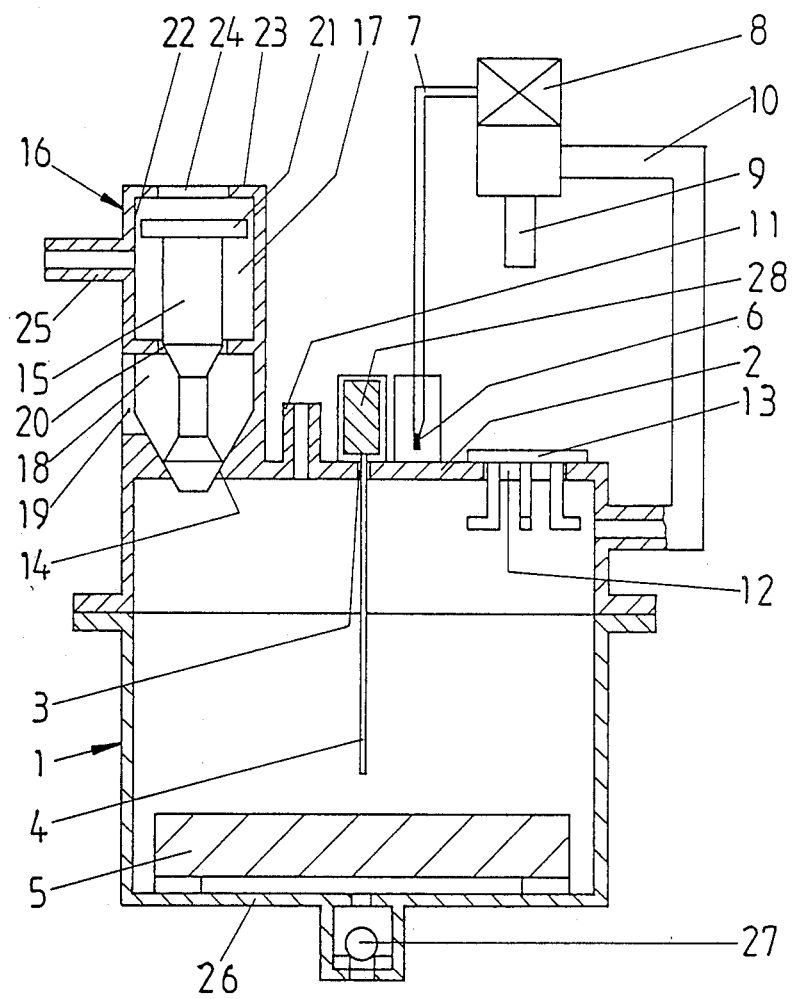

RINSE-INJECTION BOX FOR AUTOMATICALLY INTRODUCING CONTROLLED FLOWS OF A RINSE

BACKGROUND OF THE INVENTION

The invention concerns a rinse-injection box for automatically introducing controlled flows of a rinse, wherein the rinse is suctioned out of a reservoir when a valve opens and connects the box to a vacuumized line and wherein the box has an inlet for water in its lid that communicates with a water line provided with a shutoff valve.

A rinse-injection box of this type is known, for example, from German OS No. 3 033 816. The section of the water line extending from the shutoff valve is permanently secured to the lid of the box. Once the rinse has been injected, the box must be rinsed out with water to eliminate the residual rinse. The rinse-injection box must be filled to overflowing with water in order to ensure that any residue adhering to the bottom of the lid is eliminated. The known box has a drawback in that non-potable water can be suctioned back into the drinking-water line. Since this is impermissible, measures must be taken when installing the box to prevent liquid from flowing back into the water line from the box.

SUMMARY OF THE INVENTION

The object of the present invention is to improve a rinse-injection box of the aforesaid type without impairing its function to the extent that no non-potable water will be suctioned back into the drinking-water line even when the box is full to overflowing.

The object is attained in accordance with the invention by an improvement wherein another valve with an opening into the atmosphere is positioned between the shutoff valve and the inlet, whereby the incoming water keeps the valve open and its body closes off the inlet.

Since the second valve opens automatically when water flows in, the water can flow unimpeded into the rinse-injection box. The opening to the atmosphere simultaneously prevents water from entering the water line from the rinse-injection box when the box is full, because no vacuum can exist at atmospheric pressure. If, on the other hand, the supply of water is discontinued, the valve body will seal off the inlet, permitting the rinse-injection box to be vacuumized as required for the subsequent rising process.

The second valve in one preferred embodiment of the invention can have a control chamber and a safety chamber that communicate through a constriction. This measure makes it possible to initially establish an elevated water pressure in the control chamber in order to activate the valve body before the water can enter the rinse-injection box through the constriction and the inlet.

It will be practical to design the valve body such that, when it is in its closure position, it will narrow the constriction and, when it is in its opening position, it will leave it open.

Opening force can easily be applied to the valve piston if the latter is provided with a cylindrical cap associated with the inner surface of the wall of the control chamber.

To prevent water from backing up behind the cylindrical cap and eventually detrimentally affecting the function of the valve body, the top of the control chamber can have an opening to the atmosphere.

To ensure effective rinsing of the bottom of the lid of the rinse-injection box, the lid can have an overflow opening. The overflow opening should be as remote from the inlet as possible.

One preferred embodiment of the rinse-injection box has an activating rod for adjusting the level of the liquid therein, whereby the rod enters the box from outside through a ventilating bore in the lid and whereby a switching contact is associated with the rod outside of the box and a float is associated with it inside the box. The level at which the liquid stands while the rinse is being suctioned up can accordingly be adjusted in a simple way be employing interchangeable activating rods of various lengths that can be replaced without opening the rinse-injection box.

One embodiment of the invention will now be described with reference to the drawing, wherein:

BRIEF DESCRIPTION OF THE DRAWING

The FIGURE is a cross-sectional view of a rinse-injection box according to the present invention.

DETAILED DESCRIPTION OF THE INVENTION

A rinse-injection box 1 has a lid 2 with a ventilating bore 3, through which an activating rod 4 extends into the box, inside of which is a float 5. Above lid 2, activating rod 4 has a control head 28 associated with a switching contact 6 that communicates with a magnetic valve 8 through a line 7. Magnetic valve 8 connects rinse-injection box 1 to an unillustrated vacuum line through lines 9 and 10. A line that communicates with a reservoir for concentrated liquid rinse can be attached to a connection 11. In lid 2 is an overflow opening 12 with a valve insert 13. Lid 2 also has an inlet 14, which can be closed off by the body 15 of a valve 16. Valve 16 has a control chamber 17 and a safety chamber 18. Safety chamber 18 has an opening 19 to the atmosphere. Between control chamber 17 and safety chamber 18 is a constriction 20 that can be opened by valve body 15. Inside control chamber 17, the valve body has a cylindrical cap 21 that rests against the inside surface 22 of the wall of the chamber. At the top 23 of control chamber 17 is an opening 24 to the atmosphere. The control chamber can be connected to an unillustrated water line that contains a shutoff valve through a connection 25. In the floor 26 of rinse-injection box 1 is a check valve 27.

The rinsing process is initiated by establishing a communication between rinse-injection box 1 and an unillustrated vacuum line through magnetic valve 8 and lines 9 and 10. The resulting flow of air closes check valve 27. The vacuum suctions rinse from a reservoir through connection 11 and through an unillustrated line. As the level of liquid rises, float 5 travels up and contacts activating rod 4, which also travels up. The control head 28 on activating rod 4 triggers a switching contact 6, closing magnetic valve 8 and discontinuing the communication between rinse-injection box 1 and the vacuum line. Air can now flow into box 1 through ventilating bore 3, destroying the vacuum. Once the pressure in the box is atmospheric, at the very latest, check valve 27 will open, allowing the rinse to flow out. Water is then introduced into control chamber 17 through connection 25. Since constriction 20 is initially still narrowed by valve body 15, the pressure in control chamber 17 will increase and act on the cylindrical cap 21 on valve body 15, lifting it. This releases both constriction 20 and inlet 14, allowing the water unimpeded access to rinse-injection box 1. The same procedure includes opening magnetic valve 8, so that, when the box is completely full, water can also enter the vacuumized line through lines 9 and 10. The cross-sections of the lines are related in such a way that less water will be suctioned off through lines 9 and 10 than is supplied through valve 16. This prevents vacuum from becoming established in the rinse-injection box, so that water can also flow out of it through check valve 27. Enough water will enter to fill the box to overflowing, and some will even leave through overflow opening 12.

The invention also ensures a flow against the bottom of lid 2, extending from inlet 14 to overflow opening 12. The opening 19 in safety chamber 18 reliably prevents liquid from flowing back into the water line from the rinse-injection box at all stages of operation.

Backflow is also prevented in that both constriction 20 and cylindrical cap 21 are designed to ensure that the seal at those points will not be absolute. Thus, connection 25, which communicates with the water line, will be ventilated no matter what position valve body 15 is in.

What is claimed is:

1. In a rinse-injection box for automatically introducing controlled flows of a rinse, comprising means forming a liquid chamber including a lid, an inlet in the lid for water, means forming a suction opening for connecting to a vacuumized line, and an inlet for the rinse, the improvement comprising: valve means positioned upstream of the water inlet and having an opening to the atmosphere and a valve body mounted to sit in a closing position wherein the water inlet is closed off and responsive to incoming water for moving to an opening position wherein the water inlet is open and wherein the valve means has means forming a control chamber, a safety chamber downstream of the control chamber and a constriction in which the valve body sits and through which the control chamber and the safety chamber communicate and wherein the opening to the atmosphere is in the safety chamber.

2. The rinse-injection box as in claim 1, wherein the valve body is configured to narrow the constriction when in the closing position and to widen the constriction when in the opening position.

3. The rinse-injection box as in claim 1, wherein the valve body has a cylindrical cap facing an inner surface of a top wall of the control chamber.

4. The rinse-injection box as in claim 1, wherein the control chamber has a top wall having an opening to the atmosphere.

5. The rinse-injection box as in claim 1, wherein the lid of the rinse-injection box has an overflow opening.

6. The rinse-injection box as in claim 1, further comprising an activating rod responsive to the level of the liquid in the liquid chamber for controlling the vacuumized line, wherein the rod enters the box from outside through a ventilating bore in the lid and further comprising a float inside the liquid chamber for contacting the rod and a switching contact associated with the rod outside of the box.

* * * * *